United States Patent
Shen et al.

(10) Patent No.: US 12,416,366 B2
(45) Date of Patent: Sep. 16, 2025

(54) MULTI-FUNCTIONAL TEE

(71) Applicant: Xiamen GSH Technology CO., LTD., Xiamen (CN)

(72) Inventors: Biao Shen, Xiamen (CN); Sheng Kong, Xiamen (CN); Yiqun Lin, Xiamen (CN); Shaochun Lin, Xiamen (CN)

(73) Assignee: Xiamen GSH Technology CO., LTD., Xiamen (CN)

( * ) Notice: Subject to any disclaimer, the term of this patent is extended or adjusted under 35 U.S.C. 154(b) by 169 days.

(21) Appl. No.: 18/447,141

(22) Filed: Aug. 9, 2023

(65) Prior Publication Data
US 2024/0392883 A1    Nov. 28, 2024

(30) Foreign Application Priority Data
May 26, 2023   (CN) .......................... 202321316441.3

(51) Int. Cl.
*F16K 11/044*   (2006.01)
*E03C 1/04*   (2006.01)
*F16K 31/44*   (2006.01)

(52) U.S. Cl.
CPC ............ *F16K 11/044* (2013.01); *F16K 31/44* (2013.01); *E03C 1/04* (2013.01); *Y10T 137/9464* (2015.04)

(58) Field of Classification Search
CPC ........ E03C 1/086; E03C 1/0404; E03C 1/057; E03C 2001/0415; E03C 1/0416; E03C 1/025; E03C 1/0408; E03C 1/0409; E03C 2201/30; Y10T 137/9464
See application file for complete search history.

(56) References Cited

U.S. PATENT DOCUMENTS 4,523,604 A * 6/1985 Hutto .................... F16K 5/0414
                                                          137/107
5,185,893 A * 2/1993 Lin .......................... E03C 1/023
                                                          137/597

(Continued)

FOREIGN PATENT DOCUMENTS

CN    217355679 U      9/2022
ES    2182635 A1 *     3/2003     .......... E03C 1/0404
KR    101706139 B1 *   2/2017

OTHER PUBLICATIONS

KR-101706139B1B1—Translation, Ho (Year: 2017).*
ES 2182635 A1—Translation, Soler (Year: 2003).*

*Primary Examiner* — Daphne M Barry
(74) *Attorney, Agent, or Firm* — Westbridge IP LLC

(57) ABSTRACT

A multi-functional tee includes a tee body, a double control valve core, a ring knob, and a button. The double control valve core includes a rotating switching ring and a press rod which are coaxially arranged. The ring knob is mounted on the rotating switching ring of the double control valve core. According to the application, the double control valve core is applied to the tee, the required functions are selected according to the actual needs, or the tees with different combined functions and styles are arranged. In addition, after the double control valve core is adopted, the problem that the volume of the tee needs to be large in the presence of a plurality of switches, or the size of the switch needs to be reduced and mounting positions are in a compact design may be avoided.

8 Claims, 8 Drawing Sheets

(56) References Cited

U.S. PATENT DOCUMENTS

| | | | | |
|---|---|---|---|---|
| 7,775,462 B2* | 8/2010 | Herring | ............... | B05B 1/3046 |
| | | | | 4/677 |
| 10,718,103 B2* | 7/2020 | Johnson | ............ | F16K 11/0445 |
| 10,751,737 B2* | 8/2020 | Lu | ..................... | B05B 1/1618 |
| 11,156,302 B2* | 10/2021 | Jones | .................. | E03C 1/0408 |
| 11,674,607 B2* | 6/2023 | Jones | ...................... | E03C 1/02 |
| | | | | 137/15.17 |
| 11,702,825 B2* | 7/2023 | Chauveau | ............ | F16K 19/006 |
| | | | | 236/12.11 |
| 2007/0176023 A1* | 8/2007 | Herring | ................... | E03C 1/04 |
| | | | | 239/398 |
| 2021/0071398 A1* | 3/2021 | Liu | .................... | A61C 17/032 |

* cited by examiner

//MULTI-FUNCTIONAL TEE

CROSS-REFERENCE TO RELATED APPLICATIONS

This application claims priority to Chinese Patent Application No. 202321316441.3, filed on May 26, 2023, which are incorporated herein by reference in their entirety.

TECHNICAL FIELD

The application relates to the technical field of sanitary products, in particular to a multi-functional tee.

BACKGROUND

A tee is composed of a water inlet and two water outlets, which may expand an outlet waterway. At present, a tee structure on the market is relatively simple, including a tee without a switch, a tee with a switch, and a tee with a diverter switch. With the complexity of use and the diversification of consumer requirements, some tees with more complex structure and more diversified functions have been developed, such as the tees with a switching function and a flow regulating function, but these tees need to be provided with two valve cores and two switch control keys. Because the tee is a simple and small product, if too many control assemblies are arranged, the volume of the tee may increase, or a distance between the control assemblies may be too close, which not only greatly improves the difficulty in mounting, but also causes interference or inconvenience to use.

SUMMARY

In order to solve the above technical problems, the application provides a multi-functional tee structure, which is compact and easy to operate.

A multi-functional tee includes a tee body, a double control valve core, a ring knob, and a button.

The tee body is provided with a water inlet, a first water outlet, a second water outlet, and a mounting chamber. The double control valve core is mounted in the mounting chamber, and includes a rotating switching ring and a press rod which are coaxially arranged. The water inlet communicates with the first water outlet and/or the second water outlet through the double control valve core. The ring knob is mounted on the rotating switching ring of the double control valve core. The button is mounted on the press rod of the double control valve core and located at the center of the ring knob. Two control assemblies are tightly assembled together without affecting the convenience for operation, so as to reduce the space occupied by the control assemblies, thereby avoiding the volume of the tee from being too large.

In order to realize the functional diversification of the tee, the rotating switching ring of the double control valve core is a switching switch capable of switching the water outlet, and the press rod is a water switch capable of turning off the water of the tee, or the rotating switching ring of the double control valve core is a flow regulating switch capable of regulating the water output of the tee, and the press rod is the water switch capable of turning off the water of the tee, or the rotating switching ring of the double control valve core is the flow regulating switch capable of regulating the water output of the tee, and the press rod is the switching switch capable of switching the water outlet.

According to the application, the double control valve core is applied to the tee, so that the functional diversification of the tee is realized, and the required functions are selected according to the actual needs, or the tees with different combined functions and styles are arranged. In addition, after the double control valve core is adopted, the problem that the volume of the tee needs to be larger in the presence of a plurality of switches, or the size of the switch needs to be reduced and mounting positions are in a compact design may be avoided.

Preferably, the periphery of the button is provided with a ring groove, the ring groove is opposite to a peripheral wall of a receding opening, and an elastic rubber ring is arranged in the ring groove, which may avoid the shaking of the button, and improve the hand feeling of the button and the ring knob.

Preferably, the periphery of the knob is provided with a shifting block, which is convenient for users to use and prevents hand slip.

Preferably, an axial direction of the first water outlet and/or the second water outlet is vertical, and the first water outlet or the second water outlet is provided with a water outlet device holder, which may be configured to place a shower head or a spray gun.

Preferably, in order to improve the flexibility of the water outlet device holder, the water outlet device holder includes a holder and a swing rod. One end of the swing rod is rotatably mounted on the first water outlet or the second water outlet, the swing rod rotates around the first water outlet or the second water outlet, the holder is rotatably mounted on a free end of the swing rod, and a rotating shaft is coaxial with the swing rod.

Preferably, the water inlet is arranged at an end of the tee body and provided with a water outlet hole communicating with a bottom end of the mounting chamber. The first water outlet and the second water outlet are arranged at the periphery of the tee body and provided with water inlet holes communicating with the periphery of the mounting chamber.

Preferably, the press rod is the water switch capable of opening or blocking the water outlet hole of the water inlet. The rotating switching ring of the double control valve core is the switching switch capable of opening the water inlet hole of the first water outlet and blocking the water inlet hole of the second water outlet, or blocking the water inlet hole of the first water outlet and opening the water inlet hole of the second water outlet.

Preferably, in order to improve the convenience for mounting, the tee body further includes a water inlet joint and a stop screw. A water inlet end of the water inlet joint is provided with an external thread, and a water outlet end is inserted into the water inlet and provided with an annular limiting groove. The water inlet is provided with a stop screw hole toward the annular limiting groove. The stop screw is screwed into the stop screw hole and pushed into the annular limiting groove. The bottom of the annular limiting groove is an inclined plane, and the inclined plane is toward a direction outside the water inlet. When the stop screw is tightened, the water inlet joint is further screwed into the side water inlet. Two sealing rings are arranged between the water inlet joint and the water inlet to improve the degree of sealing.

Preferably, the press rod is the water switch capable of opening or blocking the water outlet hole of the water inlet. The rotating switching ring of the double control valve core is the flow regulating switch capable of regulating the opening degree of the water outlet hole of the water inlet.

Preferably, the water inlet, the first water outlet, and the second water outlet are arranged at the periphery of the tee body, the water inlet is provided with a water outlet hole communicating with the bottom end of the mounting chamber, the first water outlet is provided with a water inlet hole communicating with the bottom end of the mounting chamber, and the second water outlet is provided with a water inlet hole communicating with the periphery of the mounting chamber. The press rod is the switching switch capable of communicating the water outlet hole of the water inlet with the water inlet hole of the first water outlet, and blocking the water outlet hole of the water inlet and the water inlet hole of the second water outlet, or communicating the water outlet hole of the water inlet with the water inlet hole of the second water outlet, and blocking the water outlet hole of the water inlet and the water inlet hole of the first water outlet. The rotating switching ring of the double control valve core is the flow regulating switch capable of controlling the opening degree of the water outlet hole of the water inlet.

According to the above description of the application, the application has the following beneficial effects.

Firstly, the double control valve core is applied to the tee, so that the functional diversification of the tee is realized. In addition, after the double control valve core is adopted, the problem that the volume of the tee needs to be larger in the presence of a plurality of switches, or the size of the switch needs to be reduced and mounting positions are in a compact design may be avoided.

Secondly, the double control valve core without combined functions is selected to meet the diversified needs of consumers.

Lastly, the elastic rubber ring is arranged between the knob and the button, which may avoid the shaking of the button, and improve the hand feeling of the button and the knob.

By arranging the rotatable water outlet device holder, the flexibility of the shower head or the spray gun mounted thereon is improved.

BRIEF DESCRIPTION OF THE DRAWINGS

The drawings described herein are used to provide a further understanding of the application, and constitute a part of the application, and the exemplary embodiments of the application and the description thereof are intended to explain the application and do not constitute an undue limitation on the application.

DETAILED DESCRIPTION OF THE EMBODIMENTS

Figure 1:
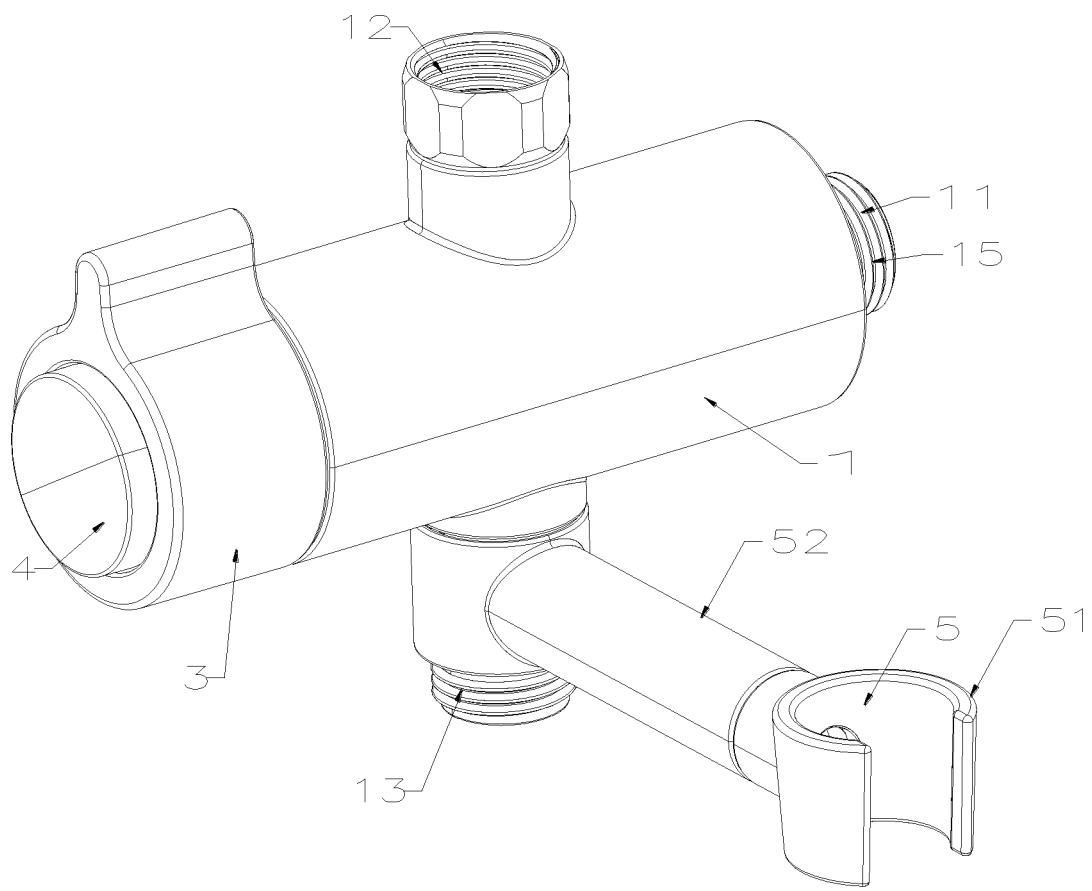
FIG. 1 is a first axial side view of a multi-functional tee provided by Embodiment 1.
Figure 2:
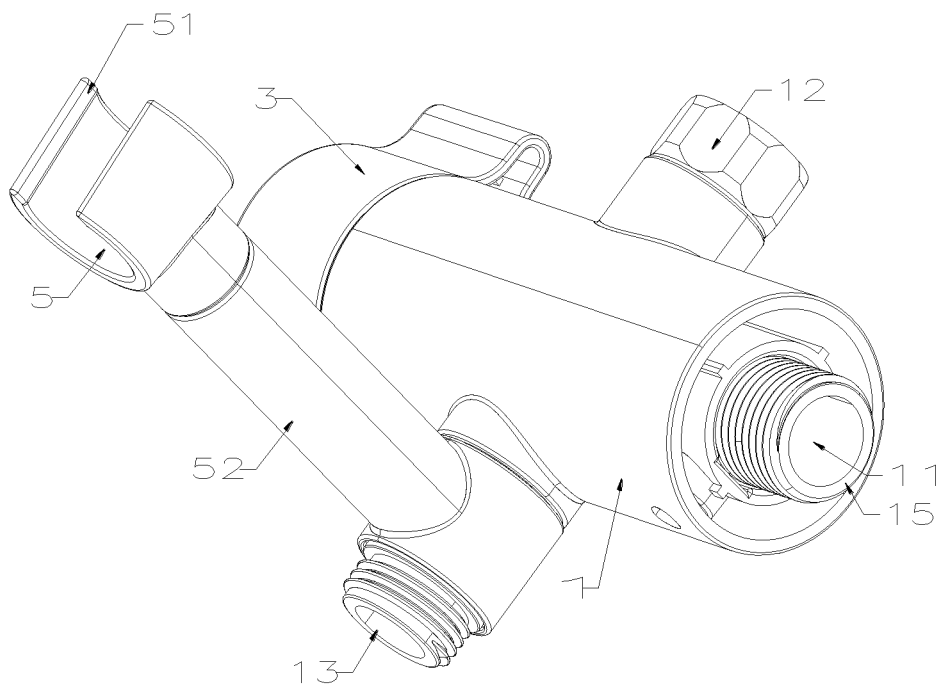
FIG. 2 is a second axial side view of a multi-functional tee provided by Embodiment 1.
Figure 3:
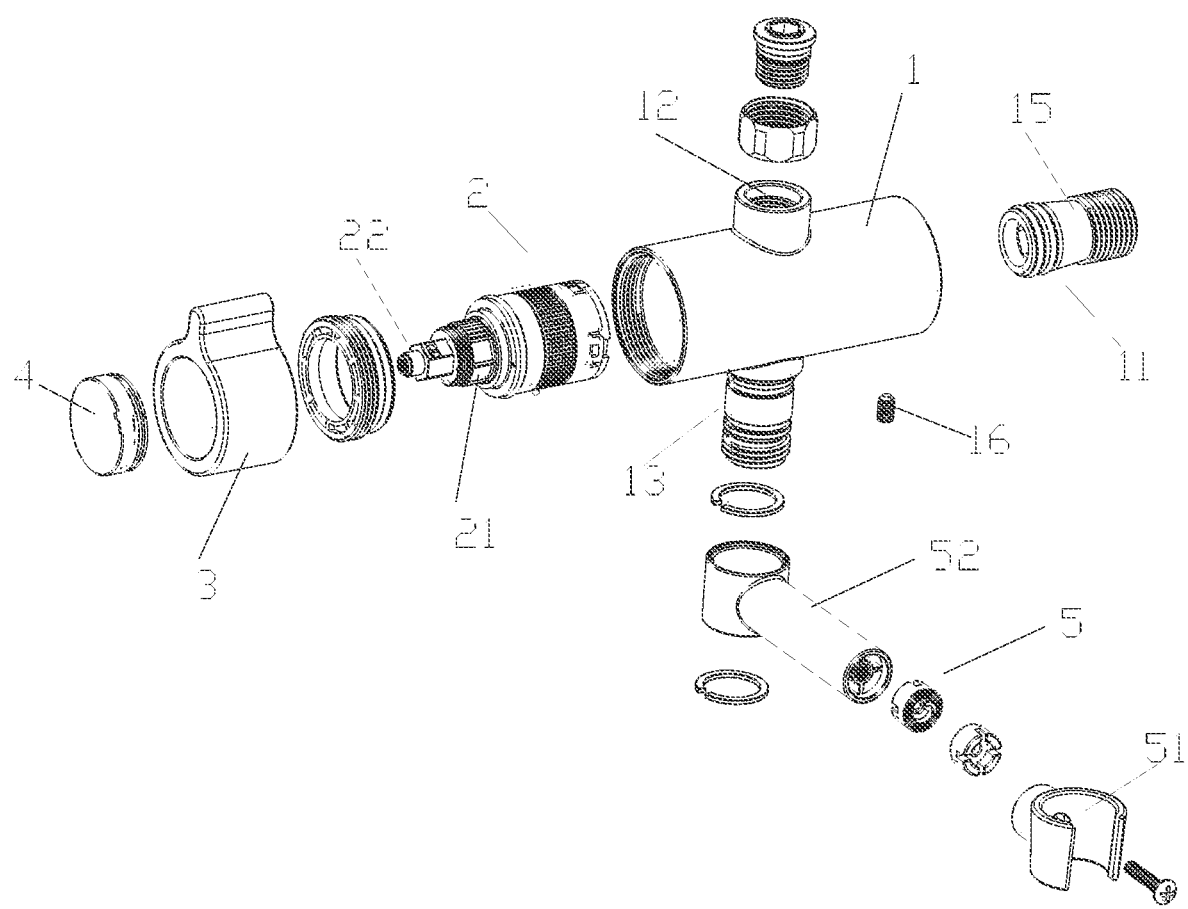
FIG. 3 is a first axial exploded view of a multi-functional tee provided by Embodiment 1.
Figure 4:
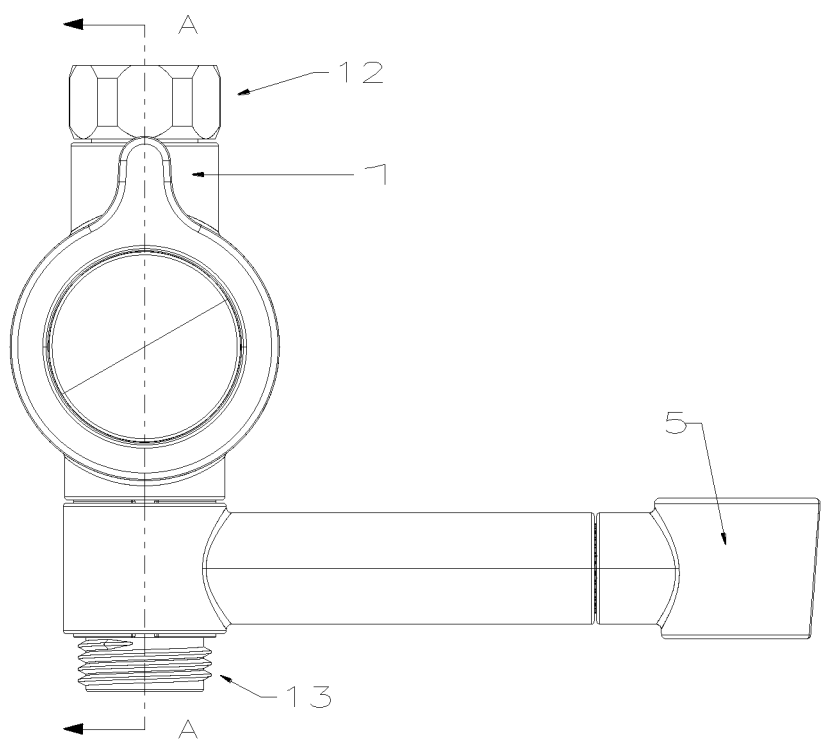
FIG. 4 is a first front view of a multi-functional tee provided by Embodiment 1.

In order to make the technical problems, technical solutions and beneficial effects to be solved by the application clearer, the application will be further described below in detail in combination with the drawings and embodiments. It is to be understood that the specific embodiments described herein are only used to illustrate the application, but are not intended to limit the application.

Embodiment 1

Referring to FIG. 1 to FIG. 5, a multi-functional tee includes a tee body 1, a double control valve core 2, a ring knob 3, and a button 4.

The tee body 1 is provided with a water inlet 11, a first water outlet 12, a second water outlet 13, and a mounting chamber 14. The double control valve core 2 is mounted in the mounting chamber 14, and includes a rotating switching ring 21 and a press rod 22 which are coaxially arranged. Specifically, when mounting the double control valve core 2, the valve core is fixed in the mounting chamber 14 by a gland.

The ring knob 3 is mounted on the rotating switching ring 21 of the double control valve core 2 and fixed by a fastener structure or an additional fixed part. The button 4 is mounted on the press rod 22 of the double control valve core 2 and located at the center of the ring knob 3. Two control assemblies are tightly assembled together without affecting the convenience for operation, so as to reduce the space occupied by the control assemblies, thereby avoiding the volume of the tee from being too large.

Figure 5:
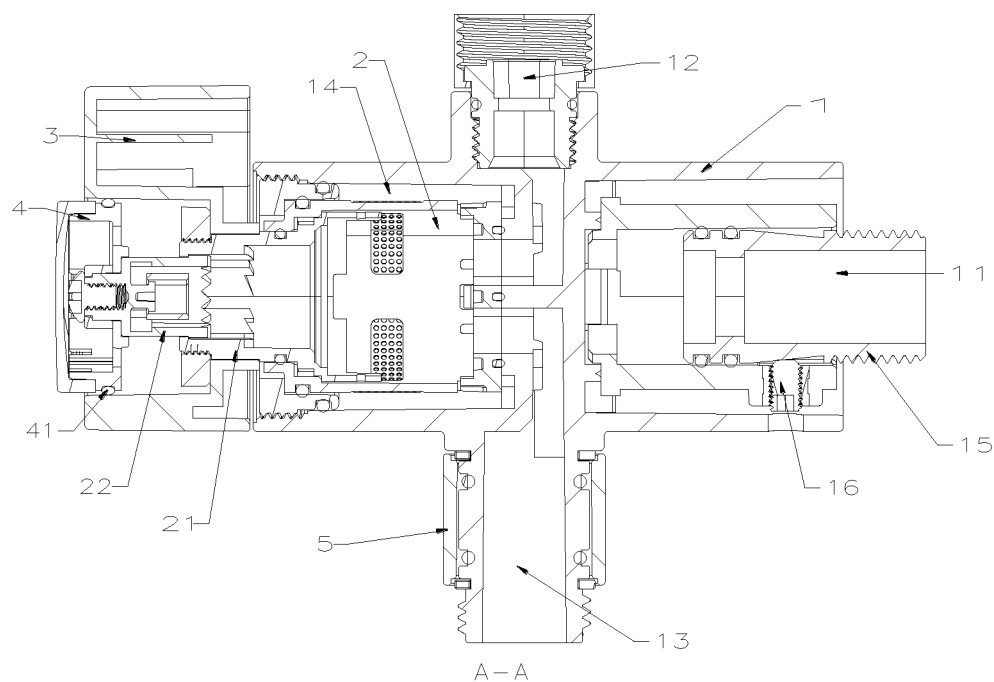
FIG. 5 is a first section view of a multi-functional tee provided by Embodiment 1.
Figure 6:
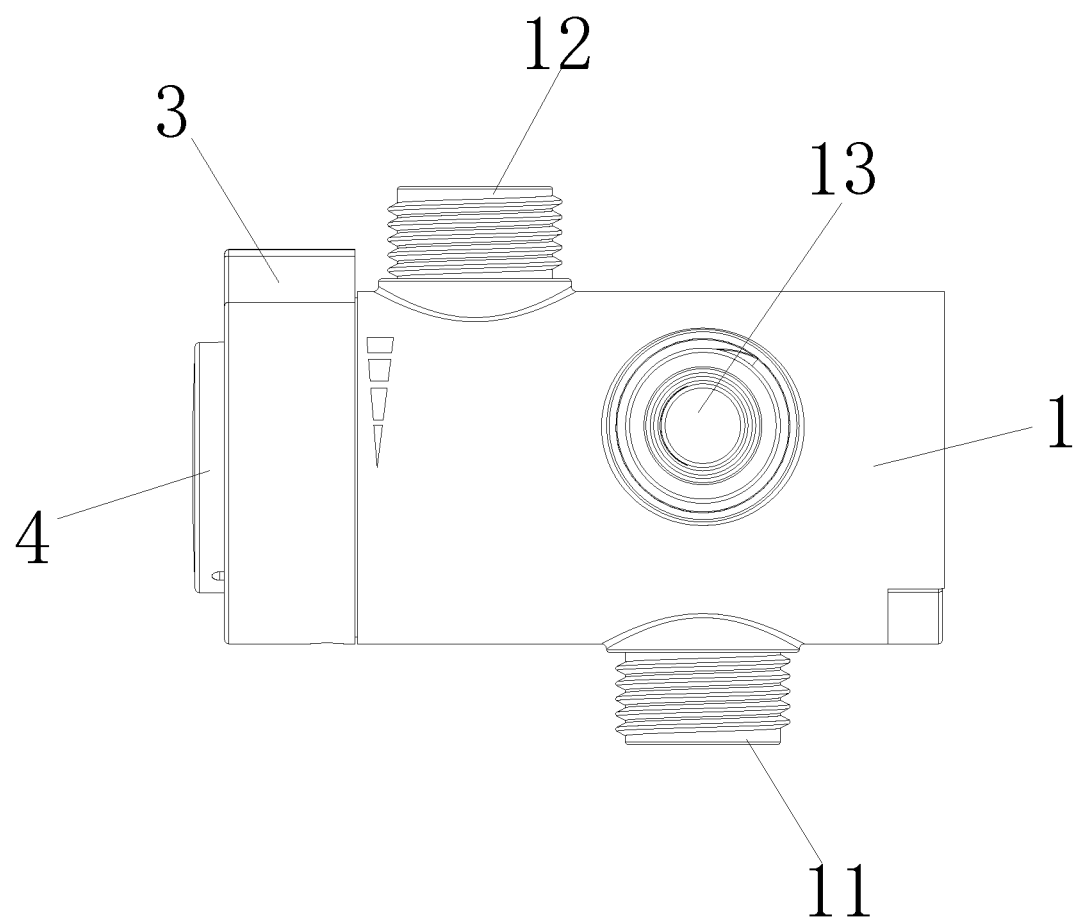
FIG. 6 is a second front view of a multi-functional tee provided by Embodiment 2.

In the embodiment, the periphery of the button 4 is provided with a ring groove, as shown in FIG. 5, the ring groove is opposite to a peripheral wall of a receding opening. An elastic rubber ring 41 is arranged in the ring groove, which may avoid the shaking of the button 4, and improve the hand feeling of the button 4 and the ring knob 3. In addition, the periphery of the knob 3 is provided with a shifting block, which is convenient for users to use and prevents hand slip.

In one embodiment, referring to FIG. 1 to FIG. 5, an axial direction of the first water outlet 12 and/or the second water outlet 13 is vertical, and the first water outlet 12 or the second water outlet 13 is provided with a water outlet device holder 5, which may be configured to place a shower head or a spray gun. In other embodiments, in order to improve the flexibility of the water outlet device holder 5, the water outlet device holder 5 includes a holder 51 and a swing rod 52. One end of the swing rod 52 is rotatably mounted on the first water outlet 12 or the second water outlet 13, the swing rod 52 rotates around the first water outlet 12 or the second water outlet 13, the holder 51 is rotatably mounted on a free end of the swing rod 52, and a rotating shaft is coaxial with the swing rod 52.

The water inlet 11 communicates with the first water outlet 12 and/or the second water outlet 13 through the double control valve core 13. In order to realize the functional diversification of the tee, the rotating switching ring 21 of the double control valve core 2 is a switching switch capable of switching the water outlet, and the press rod 22 is a water switch capable of turning off the water of the tee, or the rotating switching ring 21 of the double control valve core 2 is a flow regulating switch capable of regulating the water output of the tee, and the press rod 22 is the water switch capable of turning off the water of the tee, or the rotating switching ring 21 of the double control valve core 2 is the flow regulating switch capable of regulating the water output of the tee, and the press rod 22 is the switching switch capable of switching the water outlet.

The water inlet 11 is arranged at an end of the tee body 1 and provided with a water outlet hole communicating with a bottom end of the mounting chamber 14. The first water outlet 12 and the second water outlet 13 are arranged at the periphery of the tee body 1 and provided with water inlet holes communicating with the periphery of the mounting chamber 14. In the embodiment, the press rod 22 is the water switch capable of opening or blocking the water outlet hole of the water inlet 11. The rotating switching ring 21 of the double control valve core 2 is the switching switch capable of opening the water inlet hole of the first water outlet 12 and blocking the water inlet hole of the second water outlet 13, or blocking the water inlet hole of the first water outlet 12 and opening the water inlet hole of the second water outlet 13. Or, in other embodiments, the press rod 22 is the water switch capable of opening or blocking the water outlet hole of the water inlet 11. The rotating switching ring 21 of the double control valve core 2 is the flow regulating switch capable of regulating the opening degree of the water outlet hole of the water inlet 11.

In addition, in order to improve the convenience for mounting, the tee body 1 further includes a water inlet joint 15 and a stop screw 16. A water inlet end of the water inlet joint 15 is provided with an external thread, and a water outlet end is inserted into the water inlet 11 and provided with an annular limiting groove. The water inlet 11 is provided with a stop screw hole toward the annular limiting groove. The stop screw 16 is screwed into the stop screw hole and pushed into the annular limiting groove. The bottom of the annular limiting groove is an inclined plane, and the inclined plane is toward a direction outside the water inlet 11. When the stop screw 16 is tightened, the water inlet joint 15 is further screwed into the side water inlet 11. Two sealing rings are arranged between the water inlet joint 15 and the water inlet 11 to improve the degree of sealing.

Embodiment 2

Referring to FIG. 6 to FIG. 12, the water inlet 11, the first water outlet 12, and the second water outlet 13 are arranged at the periphery of the tee body 1, the water inlet 11 is provided with a water outlet hole communicating with the bottom end of the mounting chamber 14, the first water outlet 12 is provided with a water inlet hole communicating with the bottom end of the mounting chamber 14, and the second water outlet 13 is provided with a water inlet hole communicating with the periphery of the mounting chamber 14. The press rod 22 is the switching switch capable of communicating the water outlet hole of the water inlet 11 with the water inlet hole of the first water outlet 12, and blocking the water outlet hole of the water inlet 11 and the water inlet hole of the second water outlet 13, or communicating the water outlet hole of the water inlet 11 with the water inlet hole of the second water outlet 13, and blocking the water outlet hole of the water inlet 11 and the water inlet hole of the first water outlet 12. The rotating switching ring 21 of the double control valve core 2 is the flow regulating switch capable of controlling the opening degree of the water outlet hole of the water inlet 11.

Figure 10:
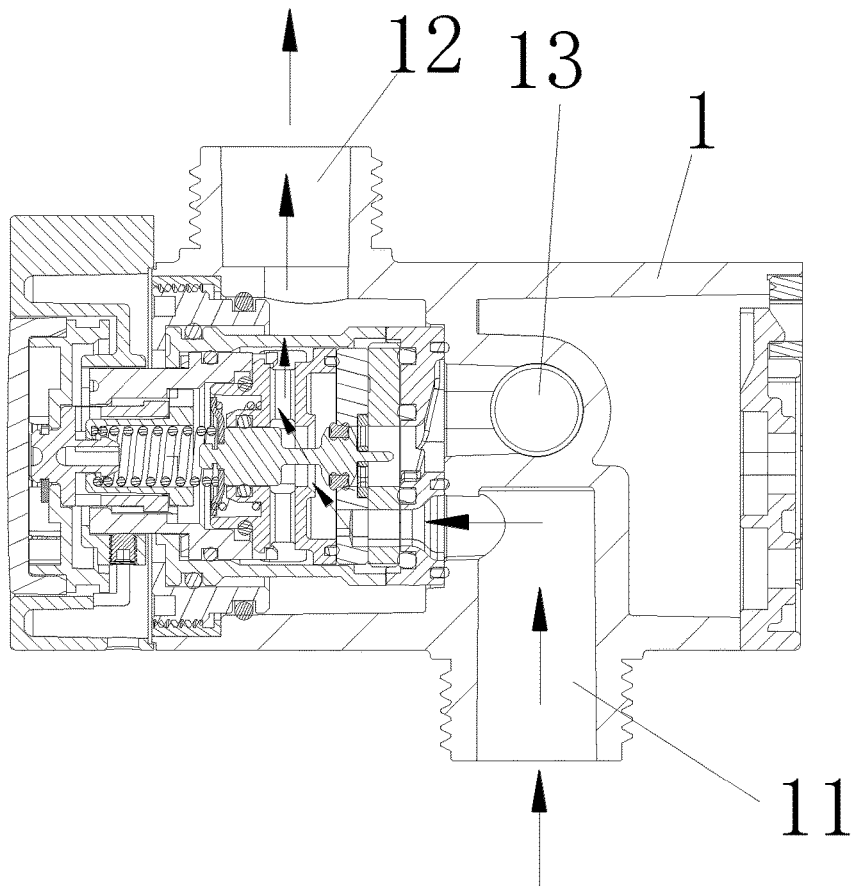
FIG. 10 is a third section view of a multi-functional tee provided by Embodiment 2.
Figure 11:
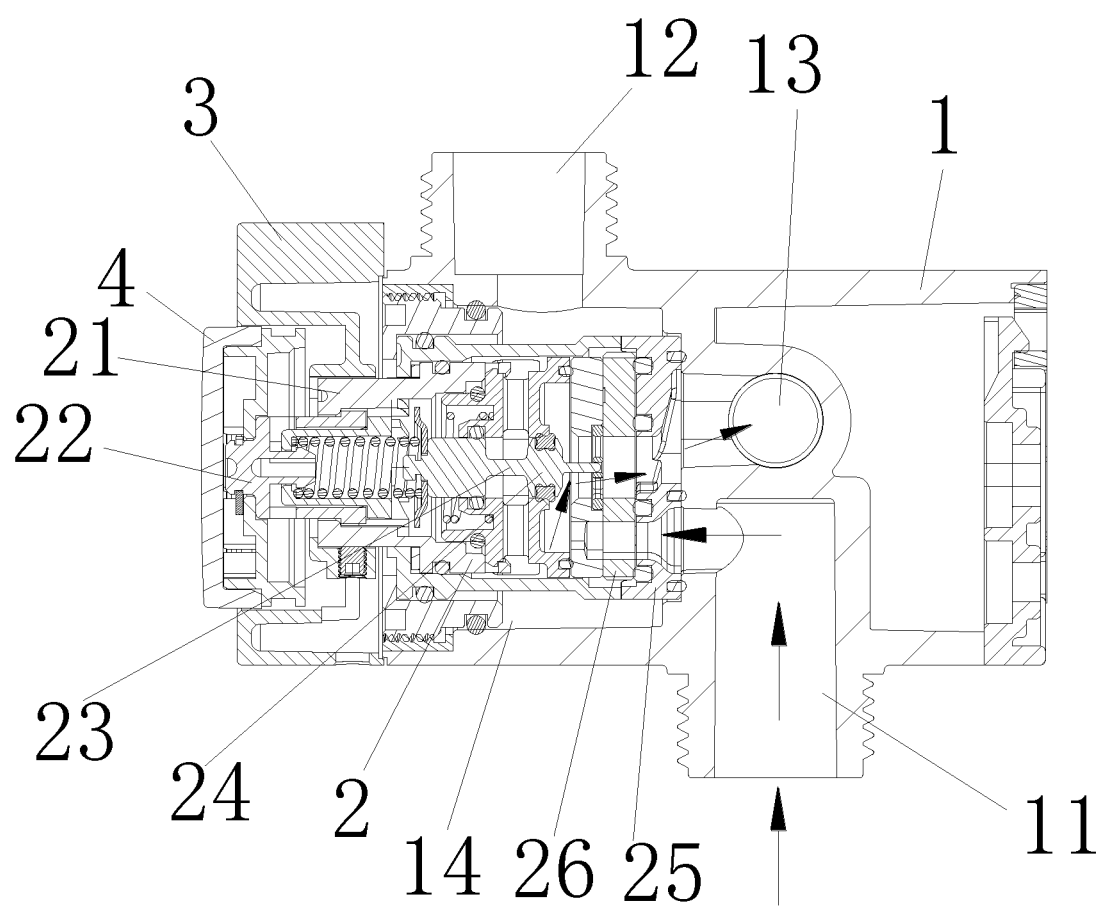
FIG. 11 is a fourth section view of a multi-functional tee provided by Embodiment 2.
Figure 12:
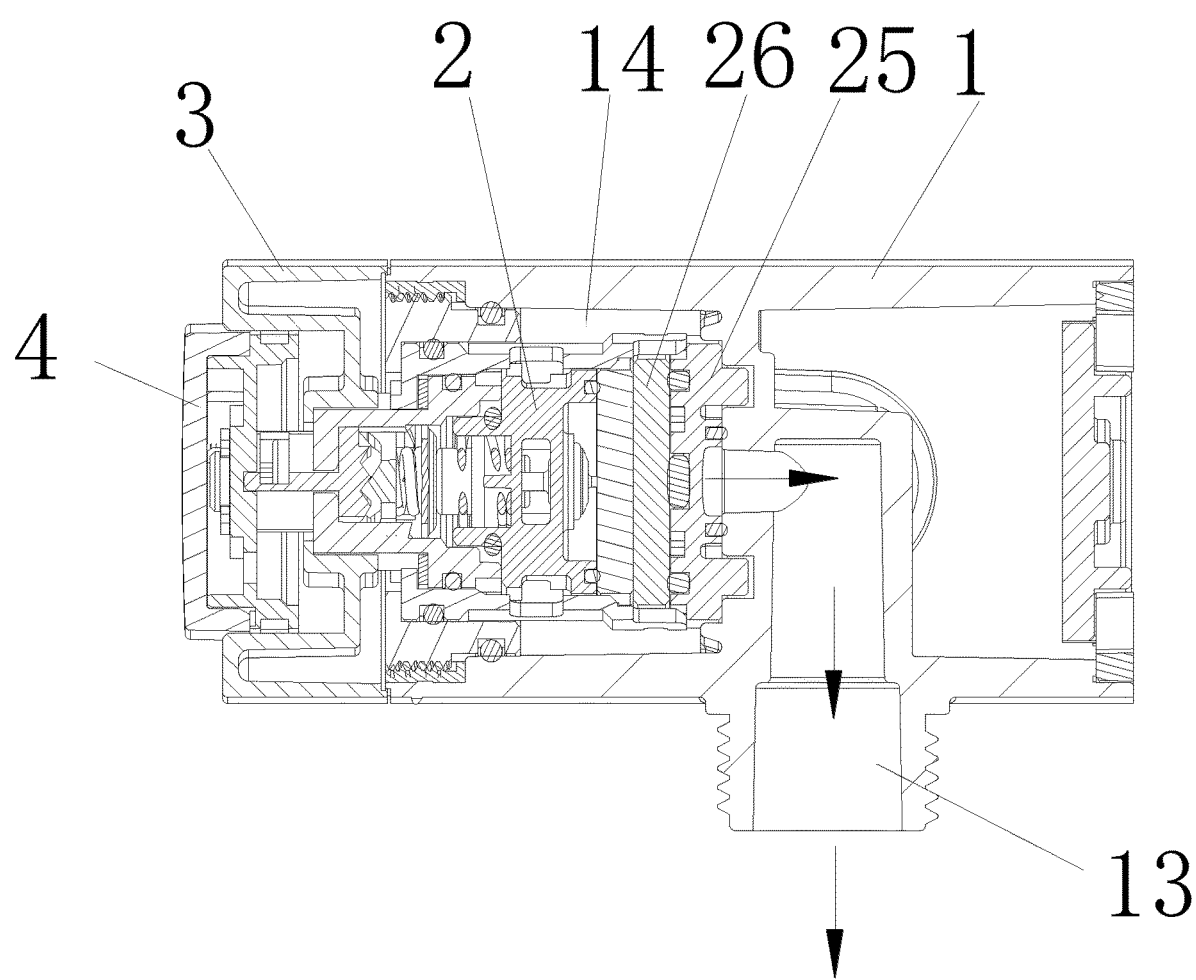
FIG. 12 is a fifth section view of a multi-functional tee provided by Embodiment 2.

In the embodiment, the press rod 22 of the double control valve core 2 is in control connection with a valve rod 23 to block the water inlet hole of the water outlet. Specifically, as shown in FIG. 10, the water inlet 11 and the first water outlet 12 are arranged to be in an initial water outlet state. When the water is turned off, the valve rod 23 blocks the water inlet 11 of the second water outlet 13 under the action of a reset spring. When the water is turned on, the press rod 22 is pressed, the valve rod 23 moves, and the water inlet 11 of the second water outlet 13 is opened. At the same time, the water inlet 11 of the first water outlet 12 is blocked, and a plug 24 of the valve rod 23 maintains the water outlet state of the second water outlet 13 under the action of water pressure. As shown in FIG. 11 and FIG. 12, when the water is turned off, the tee is restored to the water outlet state of the first water outlet 12. Of course, the maintenance of the state of the valve rod 23 may also adopt a switching structure of a ballpoint pen, that is, the water outlet state is switched once when the press rod 22 is pressed once.

Figure 7:
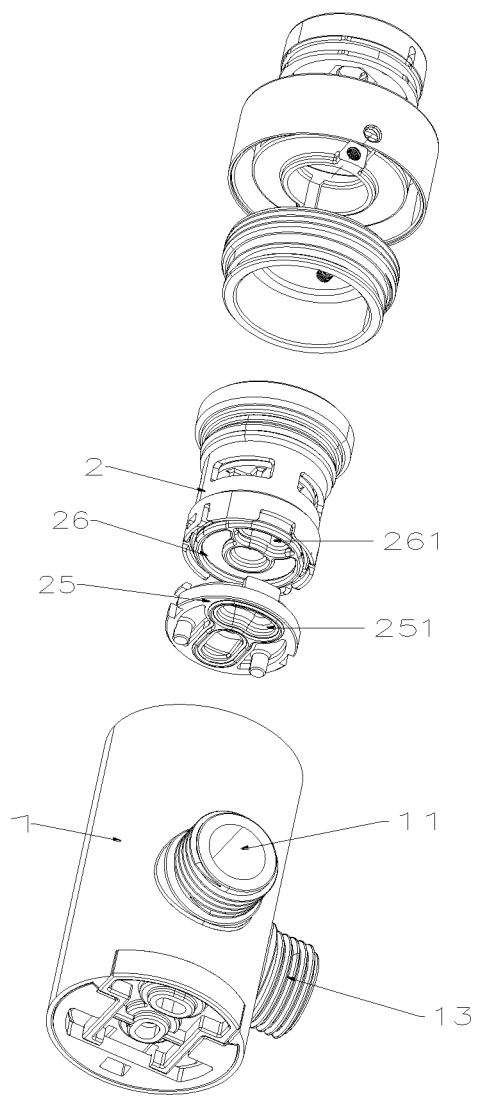
FIG. 7 is a second axial exploded view of a multi-functional tee provided by Embodiment 2.
Figure 8:
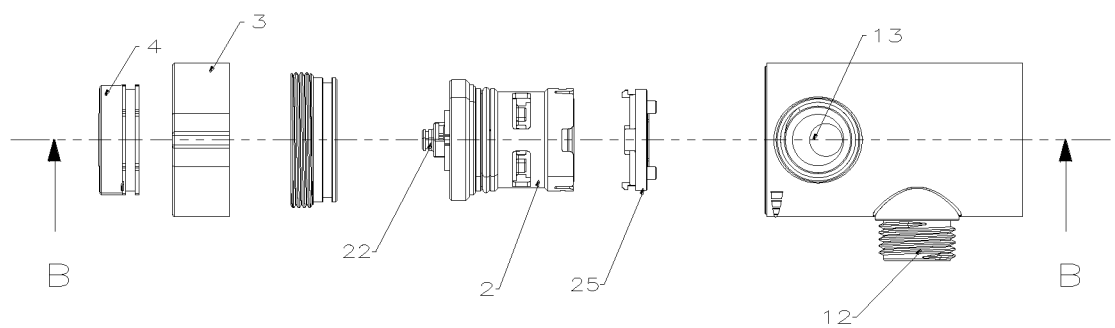
FIG. 8 is a third axial exploded view of a multi-functional tee provided by Embodiment 2.
Figure 9:
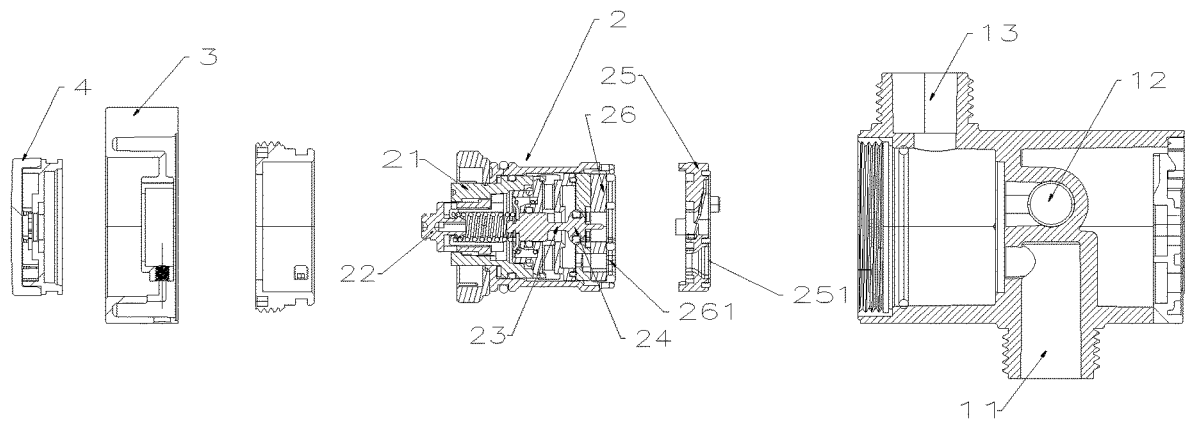
FIG. 9 is a second section view of a multi-functional tee provided by Embodiment 2.

For the flow regulating switch, as shown in FIG. 7, in the embodiment, the double control valve core 2 further includes a static valve plate 25 and a movable valve plate 26. The static valve plate 25 is provided with a water hole 251 communicating with the water outlet hole of the water inlet 11, the movable valve plate 26 is rotatably mounted relative to the static valve plate 25 and provided with a regulation hole 261, and the rotating switching ring 21 is in drive connection with the movable valve plate 26. By controlling the intersection of the regulation hole 261 and the water hole 251, the opening and closing degree of the water outlet hole of the water inlet 11 is regulated.

According to the application, the double control valve core 2 is applied to the tee, so that the functional diversification of the tee is realized, and the required functions are selected according to the actual needs, or the tees with different combined functions and styles are arranged. In addition, after the double control valve core 2 is adopted, the problem that the volume of the tee needs to be larger in the presence of a plurality of switches, or the size of the switch needs to be reduced and mounting positions are in a compact design may be avoided.

The application is exemplarily described in detail above in combination with the drawings. It is apparent that the specific implementation of the application is not limited by the above mode, and various non-substantial modifications made to the method conception and technical solutions of the application, or the conception and technical solutions of the application directly applied to other occasions without modification are all within the scope of protection of the application.

What is claimed is:

1. A multi-functional tee, comprising a tee body, a double control valve core, a ring knob, and a button; wherein
   the tee body is provided with a water inlet, a first water outlet, a second water outlet, and a mounting chamber; the double control valve core is mounted in a mounting chamber, and comprises a rotating switching ring and a press rod which are coaxially arranged; the water inlet communicates with the first water outlet and/or the second water outlet through the double control valve core; the ring knob is mounted on the rotating switching ring of the double control valve core; the button is mounted on the press rod of the double control valve core and located at a center of the ring knob;

the rotating switching ring of the double control valve core is a switching switch, and the press rod is a water switch, or the rotating switching ring of the double control valve core is a flow regulating switch, and the press rod is the water switch, or the rotating switching ring of the double control valve core is the flow regulating switch, and the press rod is the switching switch;

an axial direction of the first water outlet and/or the second water outlet is vertical, and the first water outlet or the second water outlet is provided with a water outlet device holder; and the water outlet device holder comprises a holder and a swing rod, wherein one end of the swing rod is rotatably mounted on the first water outlet or the second water outlet, the swing rod rotates around the first water outlet or the second water outlet, the holder is rotatably mounted on a free end of the swing rod, and a rotating shaft is coaxial with the swing rod.

2. The multi-functional tee according to claim 1, wherein a periphery of the button is provided with a ring groove, the ring groove is opposite to a peripheral wall of a receding opening, and an elastic rubber ring is arranged in the ring groove.

3. The multi-functional tee according to claim 1, wherein a periphery of the knob is provided with a shifting block.

4. The multi-functional tee according to claim 1, wherein the water inlet is arranged at an end of the tee body and provided with a water outlet hole communicating with a bottom end of the mounting chamber; and the first water outlet and the second water outlet are arranged at a periphery of the tee body and provided with water inlet holes communicating with a periphery of the mounting chamber.

5. The multi-functional tee according to claim 4, wherein the press rod is a water switch capable of opening or blocking the water outlet hole of the water inlet; the rotating switching ring of the double control valve core is a switching switch capable of opening the water inlet hole of the first water outlet and blocking the water inlet hole of the second water outlet, or blocking the water inlet hole of the first water outlet and opening the water inlet hole of the second water outlet.

6. The multi-functional tee according to claim 5, wherein the tee body further comprises a water inlet joint and a stop screw, wherein the water inlet end of the water inlet joint is provided with an external thread, and a water outlet end is inserted into the water inlet and provided with an annular limiting groove; the water inlet is provided with a stop screw hole toward the annular limiting groove; the stop screw is screwed into the stop screw hole and pushed into the annular limiting groove; a bottom of the annular limiting groove is an inclined plane, and the inclined plane is toward a direction outside the water inlet; and two sealing rings are arranged between the water inlet joint and the water inlet.

7. The multi-functional tee according to claim 4, wherein the press rod is a water switch capable of opening or blocking the water outlet hole of the water inlet; and the rotating switching ring of the double control valve core is a flow regulating switch capable of regulating an opening degree of the water outlet hole of the water inlet.

8. The multi-functional tee according to claim 1, wherein the water inlet, the first water outlet, and the second water outlet are arranged at a periphery of the tee body, the water inlet is provided with a water outlet hole communicating with a bottom end of the mounting chamber, the first water outlet is provided with a water inlet hole communicating with the bottom end of the mounting chamber, and the second water outlet is provided with a water inlet hole communicating with a periphery of the mounting chamber;

the press rod is a switching switch capable of communicating the water outlet hole of the water inlet with the water inlet hole of the first water outlet, and blocking the water outlet hole of the water inlet and the water inlet hole of the second water outlet, or communicating the water outlet hole of the water inlet with the water inlet hole of the second water outlet, and blocking the water outlet hole of the water inlet and the water inlet hole of the first water outlet; and the rotating switching ring of the double control valve core is a flow regulating switch capable of controlling an opening degree of the water outlet hole of the water inlet.

* * * * *